(12) United States Patent
Mepham et al.

(10) Patent No.: US 11,231,716 B2
(45) Date of Patent: Jan. 25, 2022

(54) METHOD AND APPARATUS FOR DETERMINING TRAILER DIMENSIONS IN A MOTOR VEHICLE

(71) Applicant: GM GLOBAL TECHNOLOGY OPERATIONS LLC, Detroit, MI (US)

(72) Inventors: Dan Mepham, Whitby (CA); Hongguang Sun, Baughan (CA); Yun Qian Miao, Waterloo (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 169 days.

(21) Appl. No.: 16/774,502

(22) Filed: Jan. 28, 2020

(65) Prior Publication Data
US 2021/0232142 A1 Jul. 29, 2021

(51) Int. Cl.
*G05D 1/02* (2020.01)
*G01S 13/89* (2006.01)
*B60R 11/04* (2006.01)
*G01S 13/86* (2006.01)

(52) U.S. Cl.
CPC ............ *G05D 1/0214* (2013.01); *B60R 11/04* (2013.01); *G01S 13/867* (2013.01); *G01S 13/89* (2013.01); *G05D 1/0238* (2013.01); *G05D 1/0251* (2013.01); *G05D 1/0257* (2013.01); *G05D 2201/0213* (2013.01)

(58) Field of Classification Search
CPC .. G05D 1/0214; G05D 1/0251; G05D 1/0257; G01S 7/412; G01S 7/867; G01S 13/89; G01S 13/56; G01S 13/426; B60R 11/04
See application file for complete search history.

(56) References Cited

U.S. PATENT DOCUMENTS

| | | | |
|---|---|---|---|
| 10,393,862 B2* | 8/2019 | Cashler | G01S 7/411 |
| 10,955,540 B2* | 3/2021 | Wang | G01S 7/412 |
| 2016/0153778 A1* | 6/2016 | Singh | G01B 21/08 701/36 |
| 2018/0045823 A1* | 2/2018 | Prasad | G01S 7/411 |
| 2018/0068447 A1* | 3/2018 | Prasad | B60D 1/06 |
| 2018/0365509 A1* | 12/2018 | Naserian | G06K 9/3233 |

* cited by examiner

*Primary Examiner* — Tan Q Nguyen
(74) *Attorney, Agent, or Firm* — Lorenz & Kopf LLP (57) ABSTRACT

Methods and apparatus are provided for determining a trailer dimension including a radar for generating a depth map wherein the depth map includes a detection of a first trailer surface, a camera for generating an image of the first trailer surface, a processor operative to determine a first dimension of the first trailer surface in response to the depth map and a second dimension of the first trailer surface in response to the first dimension and the image, and a vehicle controller controlling a vehicle in response to the first dimension and the second dimension.

20 Claims, 6 Drawing Sheets

METHOD AND APPARATUS FOR DETERMINING TRAILER DIMENSIONS IN A MOTOR VEHICLE

INTRODUCTION

The present disclosure relates generally to a system of determining a three dimensional trailer measurements using a camera and vehicular radar for use in a trailering application with a motor vehicle. More specifically, aspects of the present disclosure relate to systems, methods and devices for obtain trailer length and width one or more vehicular radars installed behind a towing vehicle rear fascia and determining a trailer height using radar and camera fusion approach.

Pulling a trailer with a tow vehicle has always been and remains a complicated endeavor for many drivers and automated driving systems. A ball hitch is typically employed as a trailer connection and provides a joint between the tow vehicle and the trailer. Aiming the trailer involves turning the rear of the tow vehicle in the opposite direction of the desired direction of the trailer. In addition, driver sight lines are often obstructed by the trailer, thereby requiring a second person external to the vehicle to obtain visual confirmation and provide feedback for the driver during a reversing operation. For automated and advanced driver assistance systems (ADAS) equipped vehicles, reliably determining a trailer dimensions is a key component for performing ADAS features such as autonomous vehicle operation with trailering, jack knife detection, and fully automated trailer parking. Different trailers have different dimensions thereby complicating vehicle operations by an ADAS. It would be desirable to provide improved trailer measurement detection by an ADAS while overcoming the aforementioned problems.

The above information disclosed in this background section is only for enhancement of understanding of the background of the invention and therefore it may contain information that does not form the prior art that is already known in this country to a person of ordinary skill in the art.

SUMMARY

Disclosed herein are vehicle braking methods and systems and related control logic for provisioning vehicle systems, methods for making and methods for operating such systems, and motor vehicles equipped with onboard control systems. By way of example, and not limitation, there is presented various embodiments of automatic estimation of trailer dimensions for trailering in a motor vehicle, and a method for performing automatic estimation of trailer dimensions for trailering in a motor vehicle are disclosed herein.

In accordance with an aspect of the present invention, an apparatus having a radar for generating a depth map wherein the depth map includes a detection of a first trailer surface, a camera for generating an image of the first trailer surface, a processor operative to determine a first dimension of the first trailer surface in response to the depth map and a second dimension of the first trailer surface in response to the first dimension and the image, and a vehicle controller controlling a vehicle in response to the first dimension and the second dimension.

In accordance with another aspect of the present invention a processor operative to determine a second dimension of a second trailer surface in response to the depth map wherein the first dimension and the second dimension are horizontal dimensions.

In accordance with another aspect of the present invention wherein the second dimension is determined in response to a pixel ratio within the image and the first dimension.

In accordance with another aspect of the present invention wherein the first trailer surface is a front surface of a trailer.

In accordance with another aspect of the present invention wherein the image is captured in response to a vehicle reversing operation.

In accordance with another aspect of the present invention wherein the vehicle controller is further operative to control the vehicle along a path during generation of the depth map wherein the path is not parallel to the first trailer surface.

In accordance with another aspect of the present invention wherein the radar map is generated in response to a user input.

In accordance with another aspect of the present invention wherein the radar map is generated in response to a control signal from an advanced driving assistance system.

In accordance with another aspect of the present invention, a method for capturing, by a radar, a radar map wherein the radar map is indicative of a location of a first trailer surface, capturing, by a camera, an image wherein the image includes the first trailer surface, estimating, using a processor, a first dimension of the first trailer surface in response to the radar map, estimating, using the processor, a second dimension of the first trailer surface in response to the first dimension and the image, transmitting the first dimension and the second dimension to a vehicle controller, controlling, using the vehicle controller, a vehicle performing a trailering operation in response to the first dimension and the second dimension In accordance with another aspect of the present invention further operative to determine a third dimension of a second trailer surface in response to the radar map where the first dimension and the third dimension are a width and a length of a trailer.

In accordance with another aspect of the present invention wherein the radar map is generated while the vehicle is traveling a path proximate to the trailer wherein the path is not parallel to the first trailer surface or a second trailer surface.

In accordance with another aspect of the present invention wherein controlling the vehicle includes performing an automated driving assistance algorithm during a towing operation.

In accordance with another aspect of the present invention wherein the image captured by a rear-view camera.

In accordance with another aspect of the present invention wherein image is captured in response to a vehicle reversing operation.

In accordance with another aspect of the present invention wherein radar map is generated in response to a user command received via a user interface.

In accordance with another aspect of the present invention wherein the second dimension is determined in response to a pixel ratio within the image and the first dimension.

In accordance with another aspect of the present invention, an advanced driver assistance system having a radar for generating a depth map wherein the depth map is indicative of a first surface of a trailer and a second surface of the trailer, a camera for capturing an image of the first surface, a processor configured to determine width of the trailer and a length of the trailer in response to the first surface and the second surface, the processor being further operative to determine a height of the trailer in response to the width of the trailer and the image, and a vehicle controller configured to perform an assisted driving operation in response to the width, length and height of the trailer.

In accordance with another aspect of the present invention wherein the depth map is generated in response to a user input received at a user interface.

In accordance with another aspect of the present invention wherein the advanced driver assistance system is operative to traverse a path proximate to the trailer during generation of the depth map.

In accordance with another aspect of the present invention wherein the vehicle controller is further operative to control a vehicle including the advanced driver assistance program such that the first surface and the second surface are exposed to a field of view of the radar during generation of the depth map.

BRIEF DESCRIPTION OF THE DRAWINGS

The exemplary embodiments will hereinafter be described in conjunction with the following drawing figures, wherein like numerals denote like elements, and wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

When performing ADAS trailering operations, accurate trailer dimensions are a required input for safe and reliable performance of the algorithm. Each trailer may have different dimensions and handling properties, thereby making generic assumptions about trailer parameters inefficient. The exemplary algorithm, and system to enable the algorithm, is operative to obtain trailer length and width using two short range radars installed behind vehicle rear fascia. In addition, a trailer height may be determined using radar and camera fusion approach. The system may be operative to determine a trailer length and width by performing a pass of the trailer with the equipped vehicle. The system may be operative to determine trailer length and width using detection responses from the radar system. In addition, vehicle pass angle relative to the trailer may be determined in response to radar signal received power amplitude.

Figure 1:
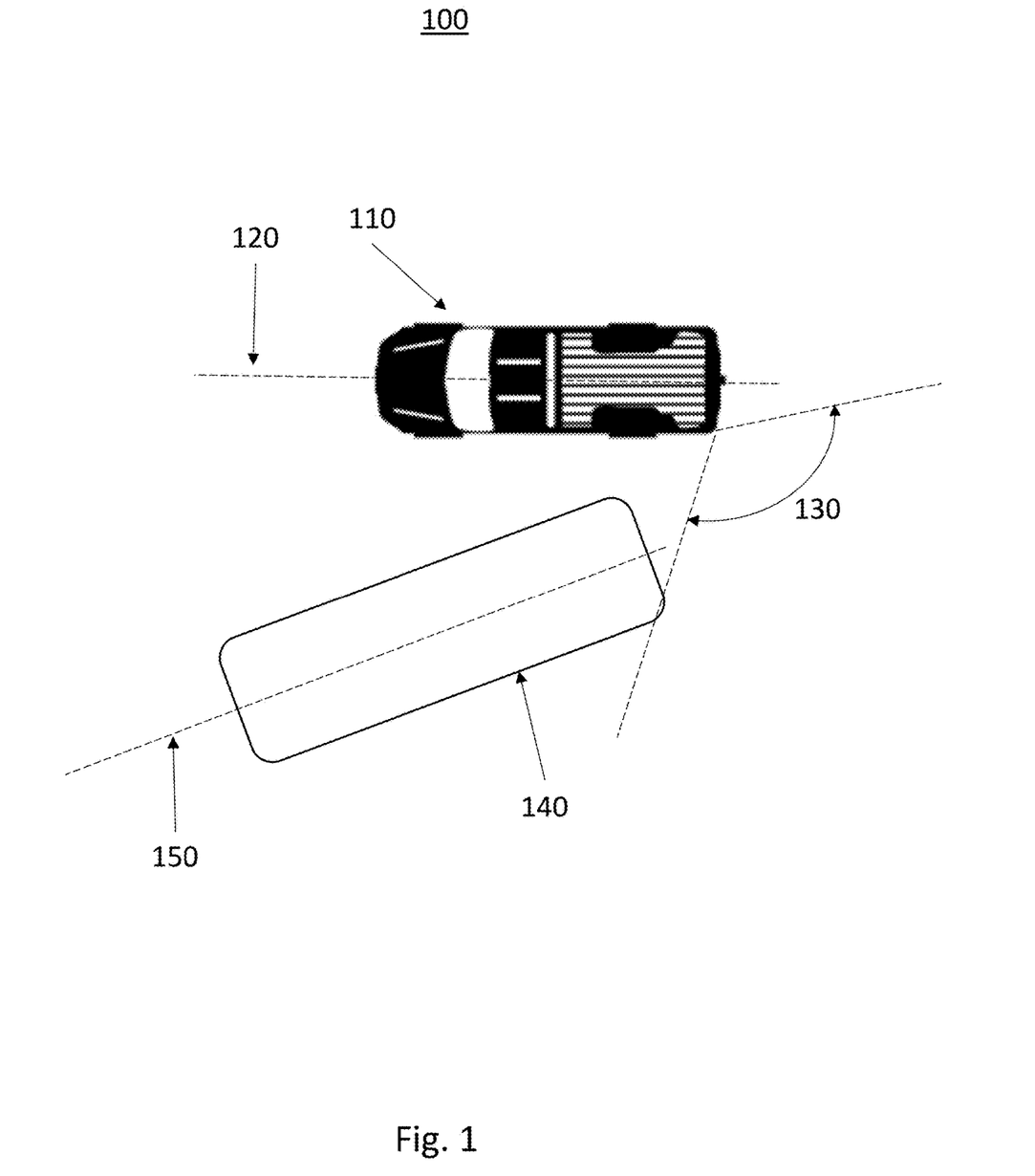
FIG. 1 shows an application for the method and apparatus for determining a trailer hitch articulation angle in a motor vehicle according to an exemplary embodiment of the present disclosure.

Turning now to FIG. 1, an exemplary environment 100 for the method and apparatus for determining trailer dimensions according to an exemplary embodiment of the present disclosure is shown. The exemplary environment 100 is depicted in a top down perspective showing a towing vehicle 110 with vehicle centerline 120, and a trailer 140 with a trailer centerline 150. The exemplary towing vehicle 110 is equipped with a vehicle radar system having a radar field of view (FOV) 130.

In this exemplary embodiment, the towing vehicle 110 is operative to perform a pass by maneuver of the trailer 140 by traveling forward past the trailer 140 in a direction along the vehicle centerline 120. Both range measurement and received power may be used to accurately determined trailer length and width. Towing vehicle 110 passes of the trailer 140 at an angle rather than parallel to the trailer to improve the signal to noise ratio and increase the accuracy of trailer length and width detection. In this exemplary embodiment, as the towing vehicle 110 travels in a direction parallel to the vehicle centerline 120 and the trailer 140 is passed through the radar FOV 130, the system is operative to detect reflections of the radar signal from the trailer as well as the radar signal amplitude reflected from points along the trailer. In response to these reflections and amplitudes, the system is operative to estimate trailer dimensions.

In an exemplary embodiment, the amplitude of the reflected radar signal may also be used to determine an angle between the vehicle centerline 120 and the trailer centerline 150. The angle between the vehicle centerline 120 and the trailer centerline 150 may be estimated by using range measurement and effective vehicle travel distance by checking received power. As such, the trailer length or width, particularly trailer with rounded corners, can be accurately determined comparing the method only using range data.

Figure 2:
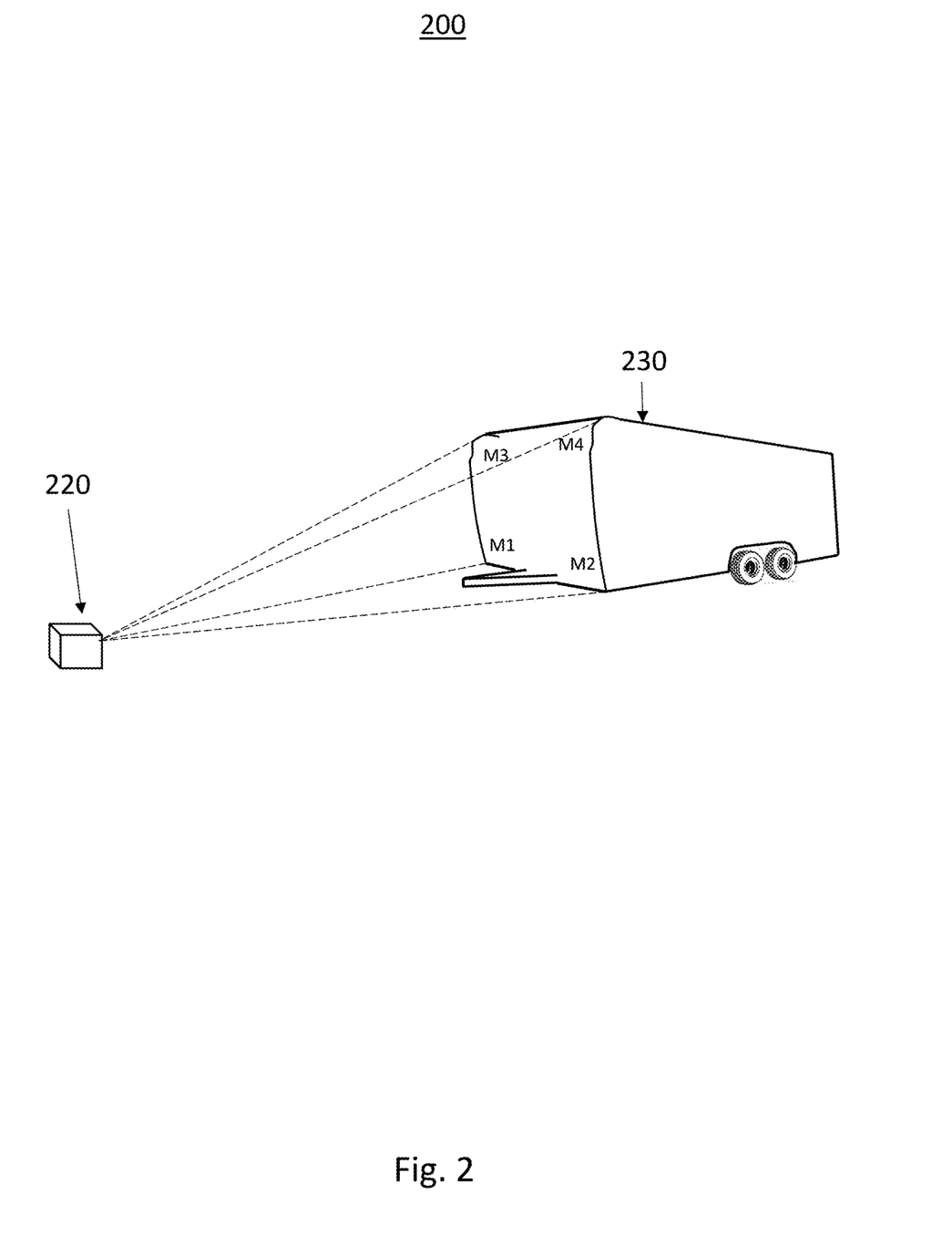
FIG. 2 shows an exemplary image according to an exemplary embodiment of a system for determining a trailer hitch articulation angle in a motor vehicle according to an exemplary embodiment of the present disclosure.

Turning now to FIG. 2, an exemplary environment 200 for determining a trailer height in a motor vehicle is shown. The exemplary environment 200 shows a trailer 230 and a camera 220. The camera 220 may be mounted in a vehicle rear fascia or the like and may be mounted proximate to the one or more vehicular radars described with respect to FIG. 1. For example, the camera 220 may be a mandated rear-view camera normally used for alleviating rear blind spots during backing up operations. In this exemplary embodiment, trailer height may be determined using fusion of the vehicle radar output and an image captured by a vehicle camera 220. Normally, it may difficult to obtain trailer height only using radar signals due to a radar's limited FOV. Typically, vehicular radars are operative to scan in a horizontal FOV and are unable to distinguish elevations of objects within the field of view. Meanwhile, a camera 220 has feasible wide view angle but having its own challenges in inferring an absolute object dimension, because of the lack of reference measure in the same image frame. Using radar and camera 220 fusion technique, the trailer height can be accurately estimated by processing trailer images in which the trailer width or length has been determined using radar signals.

In an exemplary embodiment, the towing vehicle is first operative to perform the radar scanning pass of the trailer 230 as described with respect to FIG. 1. The system is operative to determine the width (M1 to M2) of the trailer, in response to the radar scanning pass. The system is next operative to capture an image of the front of the trailer 230 using the camera 220. In one exemplary embodiment, the image may be captured during a reversing operation to connect the trailer 230 to a towing vehicle hitch or the like. In one exemplary embodiment, the height (M1 to M3) of the trailer may be determined using edge detection image processing techniques where the ratio of image pixels between the detected trailer 230 and the height of the trailer 230 is used to estimate the height of the trailer 230 having previously determined the width of the trailer 230.

Figure 3:
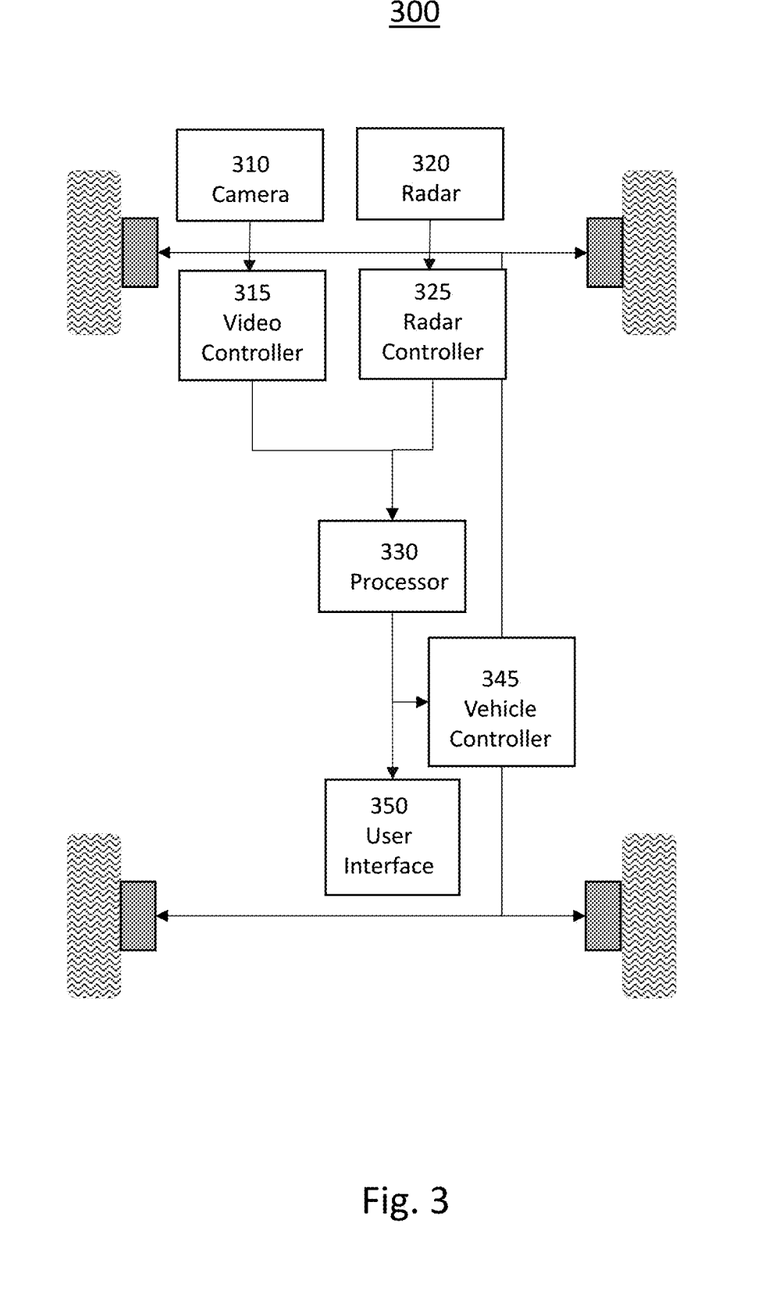
FIG. 3 shows a block diagram of an exemplary system for determining a trailer hitch articulation angle in a motor vehicle according to an exemplary embodiment of the present disclosure.

Turning now to FIG. 3, a block diagram of an exemplary system for determining trailer dimension in a motor vehicle 300 according to an exemplary embodiment of the present disclosure is shown. The system 300 may include a processor 330, a vehicle controller 345, a user interface module 350, video controller 315, a camera 310, a radar 320 and a radar controller 325.

The camera 310 may be a rear-view camera mounted to the rear of the vehicle such that the trailer hitch assembly is visible within the image captured by the camera. Alternatively, or in addition, the camera 310 could be one of a plurality of cameras mounted at separate locations around the vehicle and then aligned together in a panoramic or top down view. The camera 310 may transmit an image or series of images to the processor 330 or to a video controller 315 for processing the images and coupling this signal to the processor 330.

The radar 320 is operative to transmit an electromagnetic signal, such as an electromagnetic pulse and to receive a refection of the electromagnetic pulse from an object or surface within the radar 320 FOV. The radar 320 may be one of a plurality of radars forming a radar array, where each of the plurality of radars has a separate FOV such that composite radar map may be generated to map objects and surfaces around the host vehicle. In one exemplary embodiment, the radar may be operative to transmit pulses in discrete angular increments longitudinally within the radar FOV to generate a two-dimensional depth map of the FOV. In one exemplary embodiment, the depth may be generated by a radar controller 325 in response to data received from the radar 320. In another exemplary embodiment, the radar is operative to transmit pulses in both longitudinal and elevation angular increments and may be operative to generate a three dimensional depth map of the FOV. In addition, the radar transmitter and receiver may be replaced with a Lidar transmitter and detector for generating a two dimensional or three-dimensional depth map of a Lidar FOV.

The user interface module 350 may be a button, touch screen, dial, vehicle operation setting, such as a trailering operation mode, trailer interface, or other user input device. The user interface module 350 may be operative to receive a user input indicating request to perform the trailer measurement algorithm. For example, a vehicle operator may initiate a trailer operation mode for a towing vehicle using the user interface module 350.

The processor 330 is first operative receive radar data from the radar 320 or the radar controller 325 indicative of a distance and a direction to a detected object within the radar FOV. The received radar data may be in the form of a radar depth map, or the like, and may be used to estimate one or more longitudinal dimensions of the trailer using standard geometric operations. The processor 330 is then operative to receive an image of the trailer from the camera 310. The processor 330 may then estimate a height of the trailer using a ratio of the height and estimated longitudinal dimension calculated in response to the radar data.

In an exemplary embodiment, the processor 330 may first be operative to estimate a trailer centerline in response to a first set of radar data received from the radar or in response to an image and an image processing technique such as edge detection or the like. The processor 330 may then be operative to generate control signals to couple to the vehicle controller 345 or the line in order to control a vehicle propulsion along a path that is not parallel to the trailer centerline. The processor 330 may generate the control signals until a complete scan of the trailer has been performed by the radar 320. In one exemplary embodiment, the processor 330 may generate the vehicle control signals to couple to the vehicle controller 345 such that two sides of the trailer as scanned by one or more radars 320 having different FOVs.

In one exemplary embodiment, the processor 330 is then operative to transmit the estimated trailer dimensions to a vehicle controller 345 or the like. The vehicle controller 345 may be operative to perform a ADAS operation, such as a trailer reversing operation or autonomous driving operation in response to the trailer dimensions.

In an exemplary embodiment, the processor 330 is an ADAS controller and the measurement algorithm is performed by an ADAS vehicle controller. The ADAS controller may be operative to control the propulsion of the vehicle along the path in order to complete the radar scan. The ADAS vehicle controller may then position the vehicle such that the trailer is within the camera 310 FOV and such that an image may be captured to estimate the height of the trailer.

Figure 4:
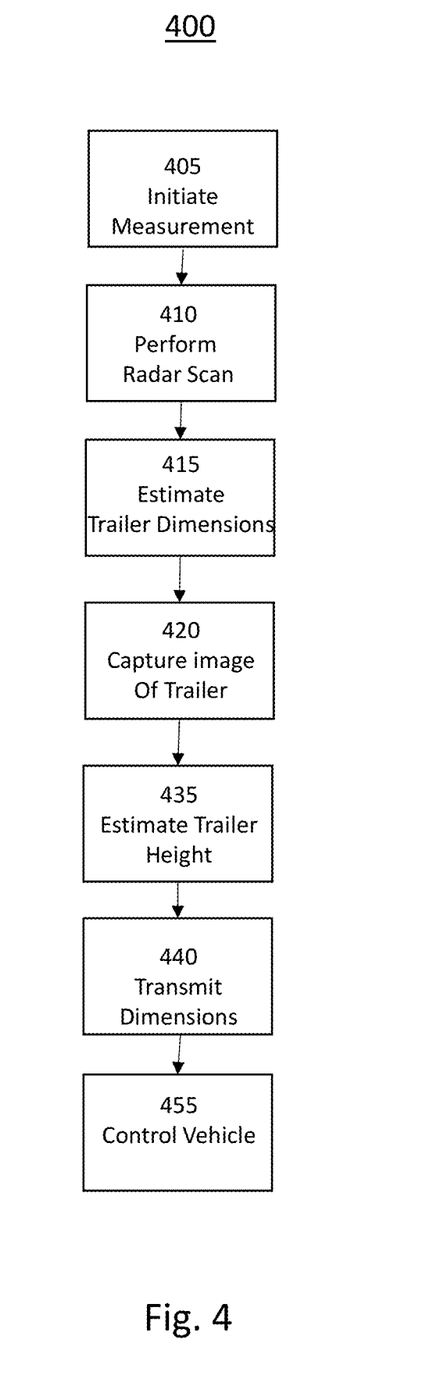
FIG. 4 shows a flow chart illustrating a method for determining a trailer hitch articulation angle in a motor vehicle according to an exemplary embodiment of the present disclosure.

Turning now to FIG. 4, a flow chart illustrating an exemplary method for determining for determining trailer dimension in a motor vehicle 400 according to an exemplary embodiment of the present disclosure is shown. In this exemplary embodiment the method is first operative to receive an indication of a measurement request 405. The measurement request may be generated in response to a user input received at a user interface, such as an initiation of a trailering mode of operation of the vehicle, or may be made in response to a request generated by an ADAS. The method may be performed in response to a driver of a vehicle controlling the vehicle in response to prompts generated by a human machine interface, such as a speaker or a visual prompt. Alternatively, the vehicle may be controlled autonomously by an ADAS system during the measurement operation or the method may be attempted to be performed during independent operation of the vehicle after a trailering mode has been initiated. For example, if a driver initiated the trailering mode of a vehicle, drives past the trailer and reverses in front of the trailer while attempting to align the towing vehicle with the trailer hitch, the method may attempt to locate the trailer and perform the measurement operation without driver intervention or knowledge of the operation. If the measurements are not successful, the system may prompt the driver or ADAS system to perform a vehicle maneuver to complete the measurements or may estimate the trailer dimensions and continue to attempt to measure the trailer during towing operations.

In response to initiation of the measurement system, the method is next operative to perform 410 a radar scan of the FOV. The radar scan is performed by transmitting an electromagnetic pulse with a radar transmitter at a known elevation and azimuth. A reflection of the electromagnetic pulse may be received by a radar receiver a distance to an object or surface at the elevation and azimuth is determined in response to the propagation time of the electromagnetic pulse. This measurement is repeated at regular angular azimuth increments to generate a radar map of the radar field of view. It is desirable to perform the radar scan along a vehicle centerline that is not parallel to the trailer centerline. In one exemplary embodiment, the non-parallel centerlines facilitate two sides, such as the side and front of the trailer, to be illuminated by the radar and measured on a single vehicle pass of the trailer.

In response to the radar map generated in response to the vehicle pass, the exemplary method is next operative to estimate 415 the trailer width and length. In one exemplary embodiment, the length can be estimated from the longest side of the rectangular object detected in the radar map. Alternately, the width of the trailer may be estimated by a side closest to the maximum allowable width of a trailer, which is often eight and one half feet. Alternatively, the width may be estimated to be the shorter of the two sides. Alternatively, the width may be determined in response to a hitch attachment, trailer interface module engagement, or towing operation of the trailer.

The method is next operative to capture 420 an image of the trailer. The radar map may be used to determine a direction of the trailer to ensure that the trailer is within the FOV of the camera. The image may be captured in response to a reversing operation while aligning the trailer hitch with the towing vehicle. The image may be captured in response to a command generated by an ADAS.

The method is next operative to estimate 435 the trailer height in response to the captured image and one of the estimated trailer width or height. For example, a pixel ratio of the image between the longitudinal estimation of the trailer dimension may be used to estimate the trailer height. In one exemplary embodiment, the longitudinal estimate within the image is adjusted in response to an angle of the trailer side to the FOV of the camera. The trailer side angle may be estimated in response to an edge detection operation performed on the captured image.

The method is next operative to transmit 440 the estimated trailer dimensions to a vehicle control system or the like to be used in an ADAS trailering operation or the like. In one exemplary embodiment, the method is next operative to control 455 a vehicle control system performing an assisted driving operation in response to the estimated trailer dimensions. For example, the method may be operative to generate a navigation route or the like, avoiding roads having an overhead clearance less than the estimated trailer height.

Figure 5:
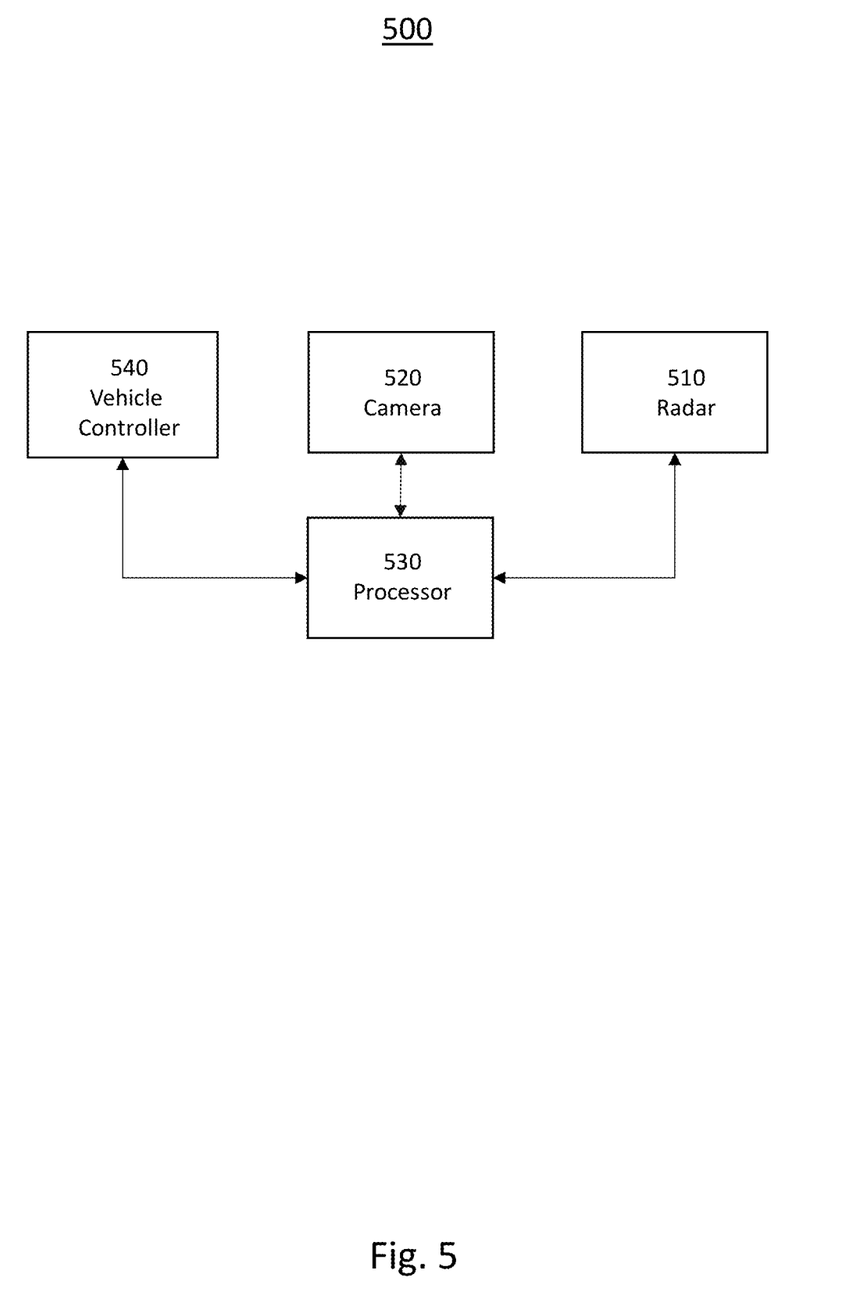
FIG. 5 shows a block diagram illustrating a system for determining a trailer hitch articulation angle in a motor vehicle according to another exemplary embodiment of the present disclosure.

Turning now to FIG. 5, a block diagram illustrating a system 500 for determining a trailer dimension according to another exemplary embodiment of the present disclosure is shown. The exemplary system includes a radar 510, a camera 520, a processor 530, and a vehicle controller 540.

In this exemplary embedment, a vehicle equipped with the system for determining the trailer dimension includes a radar 510 for generating a depth map wherein the depth map includes a detection of a first trailer surface. The radar 510 may include a radar transmitter and receiver, a radar transceiver, or may be a radar array having a plurality of radar transmitters and receivers. In an exemplary embodiment, the radar 510 has a FOV of an area proximate to the vehicle that is limited by the scanning capabilities of the radar 510. The radar 510 is operative to transmit electromagnetic pulses at regular azimuth degree increments and to receive reflected electromagnetic pulse reflections of the transmitted electromagnetic pulses if they are reflected from an object within the FOV. The radar 510 and associated circuitry and processors is then operative to generate a radar depth map indicating an azimuth angle and a distance to a reflection point at that azimuth angle. The radar 510 and/or associated hardware may be further operative to convert the azimuth angle and distance to an x,y coordinate system map. In an exemplary application, the radar map may be generated in response to a user input or in response to a control signal from an ADAS.

The exemplary system may further include a camera 520 for generating an image of the first trailer surface. The camera 520 may be one of a plurality of cameras mounted to the vehicle and may be operative to capture an image of a FOV of the camera. Multiple images of multiple camera FOVs may be combined in a panoramic image or the like to generate the image of the first trailer surface. The image may be captured in response to a vehicle reversing operation, an indication from the radar 510 or the processor 530 that the trailer surface is within the FOV of the camera 520 or initiation of a trailering mode in the vehicle.

The exemplary system may further include a processor 530 operative to determine a first dimension of the first trailer surface in response to the depth map and a second dimension of the first trailer surface in response to the first dimension and the image. The processor 530 may be a digital signal processor, a microprocessor or like, and may be used for performing mathematical and geometric operations. The processor 530 may be further operative to determine a second dimension of a second trailer surface in response to the depth map wherein the first dimension and the second dimension are horizontal dimensions. In an exemplary embodiment, the second dimension may be determined in response to a pixel ratio within the image and the first dimension. In an exemplary embodiment, the first trailer surface is a front surface of a trailer and the second trailer surface may be the side surface of a trailer.

The system may further include a vehicle controller 540 for controlling the vehicle in response to the first dimension and the second dimension. In an additional exemplary embodiment, the vehicle controller 540 may be further operative to control the vehicle along a path during generation of the depth map wherein the path is not parallel to the first trailer surface.

Figure 6:
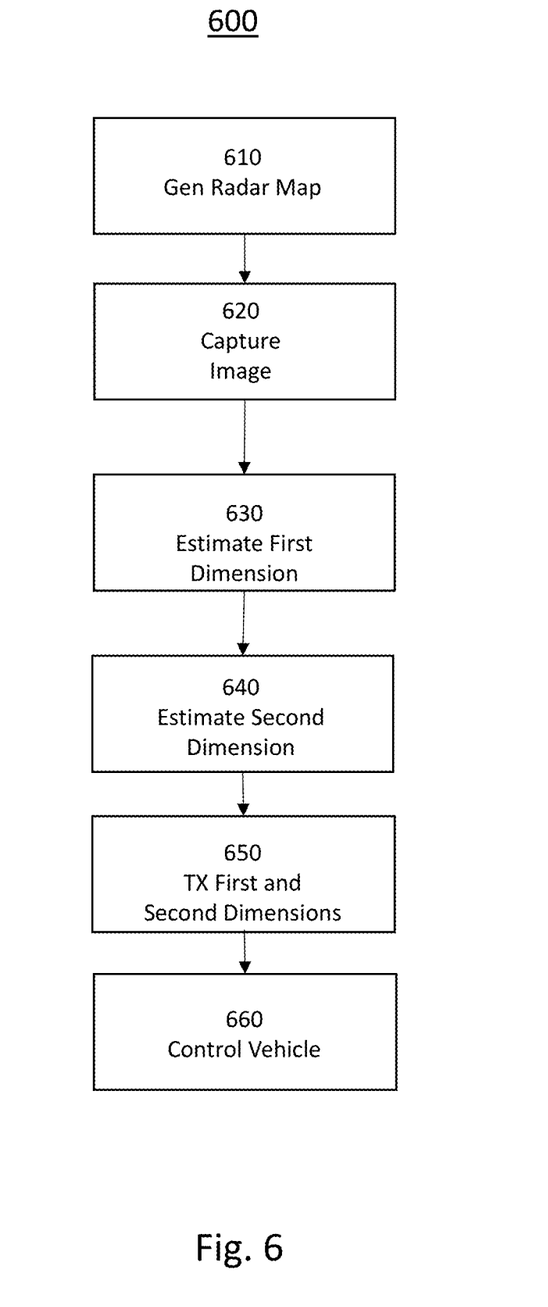
FIG. 6 shows a flow chart illustrating a method for determining a trailer hitch articulation angle in a motor vehicle according to another exemplary embodiment of the present disclosure.

Turning now to FIG. 6, a flow chart illustrating a method 600 for determining a trailer dimension according to another exemplary embodiment of the present disclosure is shown. The exemplary method 600 is first operative for generating 610 a radar map wherein the radar map is indicative of a location of a first trailer surface. The radar map may be generated in response to data generated by a radar transmitter and receiver where the data is indicative of a reflected electromagnetic pulse transmitted at an azimuth angle. The first trailer surface may be a side of a trailer, such as the front, side or rear of the trailer.

In a first exemplary embodiment, the radar map is a map indicative of a plurality of radar reflections received at regular increments of azimuth angles and are representative of a two-dimensional representation of a field of view of the radar receiver. In an additional exemplary embodiment, the radar map may be generated while the vehicle is traveling a path proximate to the trailer wherein the path is not parallel to the first trailer surface or a second trailer surface. Generation of the radar map, and initiation of the method, may be initiated in response to a user The exemplary method is next operative for capturing 620 an image wherein the image includes the first trailer surface. The image may be captured by a vehicle mounted camera, such as a rear-view camera typically mounted in a vehicle rear facia and may be captured in response to one or more of a reversing operation or an engagement of a trailering mode in the towing vehicle.

The exemplary method is then operative to estimate 630 a first dimension of the first trailer surface in response to the radar map. For example, the first dimension may be a trailer length and the estimating may be performed by a processor in response to the radar map. In a further exemplary embodiment, the method may be further operative to determine a third dimension of a second trailer surface in response to the radar map where the first dimension and the third dimension are a width and a length of a trailer.

The exemplary method is next operative for estimating 640, using the processor, a second dimension of the first trailer surface in response to the first dimension and the image. In an exemplary embodiment, the second dimension is determined in response to a pixel ratio within the image and the first dimension.

The exemplary method is next operative to transmit 650 the first dimension and the second dimension to a vehicle controller. The first dimension and the second dimension may be transmitted via a CAN bus, internal vehicle network or other local area communications network. In an exemplary embodiment, the radar map, camera image, length, width, and height of the trailer may be transmitted to a vehicle controller or an ADAS controller or the like.

The exemplary method is next operative for controlling 660, using the vehicle controller, a vehicle performing a trailering operation in response to the first dimension and the second dimension. In an exemplary application, controlling the vehicle may include performing an automated driving assistance algorithm during a towing operation.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a radar for generating a depth map wherein the depth map includes a detection of a first trailer surface;
   a camera for generating an image of the first trailer surface;
   a processor operative to determine a first horizontal dimension of the first trailer surface in response to the depth map and a vertical dimension of the first trailer surface in response to the first horizontal dimension and the image; and
   a vehicle controller controlling a vehicle in response to the first horizontal dimension and the vertical dimension.

2. The apparatus of claim 1 wherein the processor is further operative to determine a second horizontal dimension of a second trailer surface in response to the depth map wherein the first horizontal dimension is a trailer width and the second horizontal dimension is a trailer length.

3. The apparatus of claim 1 wherein the vertical dimension is determined in response to a pixel ratio within the image and the first horizontal dimension.

4. The apparatus of claim 1 wherein the first trailer surface is a front surface of a trailer.

5. The apparatus of claim 1 wherein the image is captured in response to a vehicle reversing operation.

6. The apparatus of claim 1 wherein the vehicle controller is further operative to control the vehicle along a path during generation of the depth map wherein the path is not parallel to the first trailer surface.

7. The apparatus of claim 1 wherein the depth map is generated in response to a user input.

8. The apparatus of claim 1 wherein the depth map is generated in response to a control signal from an advanced driving assistance system.

9. A method comprising:
   capturing, by a radar, a radar map wherein the radar map is indicative of a location of a first trailer surface;
   capturing, by a camera, an image wherein the image includes the first trailer surface;
   estimating, using a processor, a first horizontal dimension of the first trailer surface in response to the radar map;
   estimating, using the processor, a vertical dimension of the first trailer surface in response to the first horizontal dimension and the image;
   transmitting the first horizontal dimension and the vertical dimension to a vehicle controller;
   controlling, using the vehicle controller, a vehicle performing a trailering operation in response to the first horizontal dimension and the vertical dimension.

10. The method of claim 9 further operative to determine a second horizontal dimension of a second trailer surface in response to the radar map where the first horizontal dimension and the second horizontal dimension are a width and a length of a trailer.

11. The method of claim 9 wherein the radar map is generated while the vehicle is traveling a path proximate to a trailer wherein the path is not parallel to the first trailer surface or a second trailer surface.

12. The method of claim 9 wherein controlling the vehicle includes performing an automated driving assistance algorithm during a towing operation.

13. The method of claim 9 wherein the image captured by a rear-view camera.

14. The method of claim 9 wherein the image is captured in response to a vehicle reversing operation.

15. The method of claim 9 wherein the radar map is generated in response to a user command received via a user interface.

16. The method of claim 9 wherein the vertical dimension is determined in response to a pixel ratio within the image and the first horizontal dimension.

17. An advanced driver assistance system comprising;
   a radar for generating a depth map wherein the depth map is indicative of a first surface of a trailer and a second surface of the trailer;
   a camera for capturing an image of the first surface;
   a processor configured to determine a width of the trailer and a length of the trailer in response to the depth map indicative of the first surface and the depth map indicative of the second surface, the processor being further operative to determine a height of the trailer in response to the width of the trailer and the image; and a vehicle controller configured to perform an assisted driving operation in response to the width, the length and the height of the trailer.

18. The advanced driver assistance system of claim 17 wherein the depth map is generated in response to a user input received at a user interface.

19. The advanced driver assistance system of claim 17 wherein the advanced driver assistance system is operative to traverse a path proximate to the trailer during generation of the depth map.

20. The advanced driver assistance system of claim 17 wherein the vehicle controller is further operative to control a vehicle including the assisted driving operation such that the first surface and the second surface are exposed to a field of view of the radar during generation of the depth map.

* * * * *